United States Patent
Huang et al.

(10) Patent No.: US 12,458,725 B2
(45) Date of Patent: Nov. 4, 2025

(54) AIR STERILIZING DEVICE

(71) Applicant: Norm Pacific Automation Corp., Hsinchu County (TW)

(72) Inventors: Horng-Tsann Huang, Hsinchu (TW); Yu-Ping Wang, Taoyuan (TW); I-Chieh Chen, Taoyuan (TW)

(73) Assignee: Norm Pacific Automation Corp., Hsinchu County (TW)

( * ) Notice: Subject to any disclaimer, the term of this patent is extended or adjusted under 35 U.S.C. 154(b) by 755 days.

(21) Appl. No.: 17/723,479

(22) Filed: Apr. 19, 2022

(65) Prior Publication Data

US 2023/0001040 A1    Jan. 5, 2023

(30) Foreign Application Priority Data

Jun. 30, 2021  (TW) .................................. 110124415

(51) Int. Cl.
*A61L 9/20*  (2006.01)
*A61L 9/16*  (2006.01)
*A61L 9/18*  (2006.01)

(52) U.S. Cl.
CPC ........ *A61L 9/20* (2013.01); *A61L 9/16* (2013.01); *A61L 9/18* (2013.01); *A61L 2209/14* (2013.01)

(58) Field of Classification Search
CPC ..... A61L 9/20; A61L 9/16; A61L 9/18; A61L 9/00–9/22; A61L 2209/14; A61L 2209/134; Y02A 50/20
See application file for complete search history.

(56) References Cited

U.S. PATENT DOCUMENTS

| | | | |
|---|---|---|---|
| 5,512,083 A * | 4/1996 | Dunne | B01D 53/06 95/143 |
| 7,050,707 B1 * | 5/2006 | Lin | F24F 3/1423 392/347 |

FOREIGN PATENT DOCUMENTS

JP    6229772 B1 * 11/2017 ............... A61L 9/16

OTHER PUBLICATIONS

JP 6229772 B1 (Original & English copy) (Year: 2017).*

* cited by examiner

*Primary Examiner* — Maris R Kessel
*Assistant Examiner* — Nebyate Seged
(74) *Attorney, Agent, or Firm* — Winston Hsu

(57) ABSTRACT

An air sterilizing device has a casing, a wheel disc covered with microporous structures, a blower, and a sterilizing module. The casing has an air inlet and an air outlet. The blower located in the casing introduces the external air from the air inlet, and the external air is filtered and sterilized by the wheel disc and the sterilizing module. The filtered and sterilized air is discharged from the air outlet. The sterilizing module locates next to the wheel disc for sterilizing the air flowing through the sterilizing module and also for sterilizing the wheel disc by the relative rotation between the wheel disc and the sterilizing module. Bacteria and viruses attached to the wheel disc are eliminated, and the filtration and sterilization functions of the wheel disc are maintained. The efficacy and the efficiency of the air sterilizing device are therefore improved.

9 Claims, 10 Drawing Sheets

AIR STERILIZING DEVICE

BACKGROUND OF THE DISCLOSURE

1. Field of the Disclosure

The present disclosure relates to an air sterilizing device, and more particularly to an air sterilizing device that can significantly improve the efficiency of filtration and sterilization, and thereby effectively eliminate viruses and bacteria in ambient air.

2. Description of the Prior Art

There are various suspended substances with different particle sizes in the air, such as dust of about 500 microns or less, bacteria of about 0.5-5 microns, and viruses of about 10-300 nanometers. Many suspended substances are invisible to the naked eye, and some (such as bacteria and viruses) are harmful to the human body. Therefore, the elimination of harmful substances in the air to maintain a clean environment and uphold human health has aroused wide public concern.

Air purifiers are usually placed in the environment to filter the air. The air flows through the filter of the air purifiers which filter out harmful substances and produce cleaner air. General filters can filter out dust and other pollutants with larger particle sizes, but substances with smaller sizes such as bacteria and viruses may still pass through such filters. In order to purify the air more effectively, a High-Efficiency Particulate Air filter (HEPA filter) is available, but needs to be regularly replaced or replaced timely depending on the pollution situation to achieve better filtration effect. If not replaced in time, the filter is prone to becoming a breeding ground for bacteria or viruses, causing secondary pollution and failure to purify the air.

In addition to filtration, sterilization or disinfection can be achieved via high temperature, chemicals, radiation, high pressure, etc. In principle, the compositions of bacteria or virus pathogens change irreversibly by physical or chemical means to achieve disinfection and sterilization. e.g., heat is used to coagulate and denature the protein of pathogens or dissolve lipids to inactivate the pathogens. Alternatively, UV is used to irradiate pathogens, destroy their structures and prevent them from continuing to proliferate.

A lot of energy will be consumed by an air purifier to heat all air in a room to a temperature for sterilization, so it is inconvenient, and even unfeasible in practice. Therefore, some air purifiers adopt an elongated member made of ceramics. The elongated member has a plurality of narrow and parallel channels, through which a heating wire is inserted and extended. When air flows through the channels, the heating wire can heat the air and sterilize it. However, such air purifiers perform sterilization only relying on the heat convection in small channels, exhibiting a severe limitation to the amount of air that can be treated and therefore resulting in low sterilization efficiency. To increase the amount of air to be treated, the electrical heating power must be increased so that the air can be heated to the required sterilization temperature, causing large energy consumption by the air purifiers during their operation.

Moreover, if such air purifiers perform sterilization via high-power heating, the temperature of the purified air is significantly higher than the ambient temperature, causing significant changes in the temperature and humidity of the environment and discomfort to the user.

SUMMARY OF THE DISCLOSURE

To solve the above problems, the present disclosure provides an air sterilizing device with lower energy consumption, higher sterilization intensity, larger air treatment amount and more compact size.

In order to achieve this purpose, an embodiment of the air sterilizing device according to the present disclosure comprises a casing, on which an air inlet and an air outlet are arranged; a blower, arranged in the casing, driving air to flow from the air inlet to the air outlet; a wheel disc, arranged in the air flow path and comprising a wheel-shaped body with uniform thickness, wherein the wheel-shaped body comprises a plurality of holes for air to flow through the wheel-shaped body, and a plurality of microporous structures on an outer surfaces of the wheel-shaped body; a first sterilizing module, arranged between the air inlet and the wheel disc and arranged adjacent to an air inlet side of the wheel disc, wherein the first sterilizing module comprises a cover, comprising an opening arranged on a first side of the cover adjacent to the wheel disc, a vent arranged on a second side of the cover away from the wheel disc, and a first space formed between the opening and the vent; a first reflector, arranged within the first space and spaced from the vent for forming a non-linear channel from the vent, through the first reflector and into the first space; a sterilizing element, arranged within the first space and located between the opening and the first reflector; and a driving mechanism, driving the wheel disc to rotate with respect to the first sterilizing module; wherein after the blower introduces the outside air into the casing through the air inlet, a first portion of the outside air flows into the first space through the non-linear channel of the first sterilizing module; wherein the first portion of the air flows through the sterilizing element, through the holes of the wheel disc and over the microporous structures, and is discharged from the air outlet to the outside of the casing; a second portion of the outside air flows through the holes of the wheel disc not covered by the first sterilizing module, over the microporous structures, and is discharged from the air outlet to the outside of the casing.

Therefore, the air sterilizing device according to the present disclosure improves the sterilization function, the efficiency of the energy utilization, and the user's comfort without significantly changing the temperature and humidity of the environment.

These and other objectives of the present disclosure will no doubt become obvious to those of ordinary skill in the art after reading the following detailed description of the preferred embodiment that is illustrated in the various figures and drawings.

BRIEF DESCRIPTION OF THE DRAWINGS

The present disclosure will be understood by referring to the following detailed description of some illustrative embodiments in conjunction with the accompanying drawings, in which.

DETAILED DESCRIPTION

Figure 1:
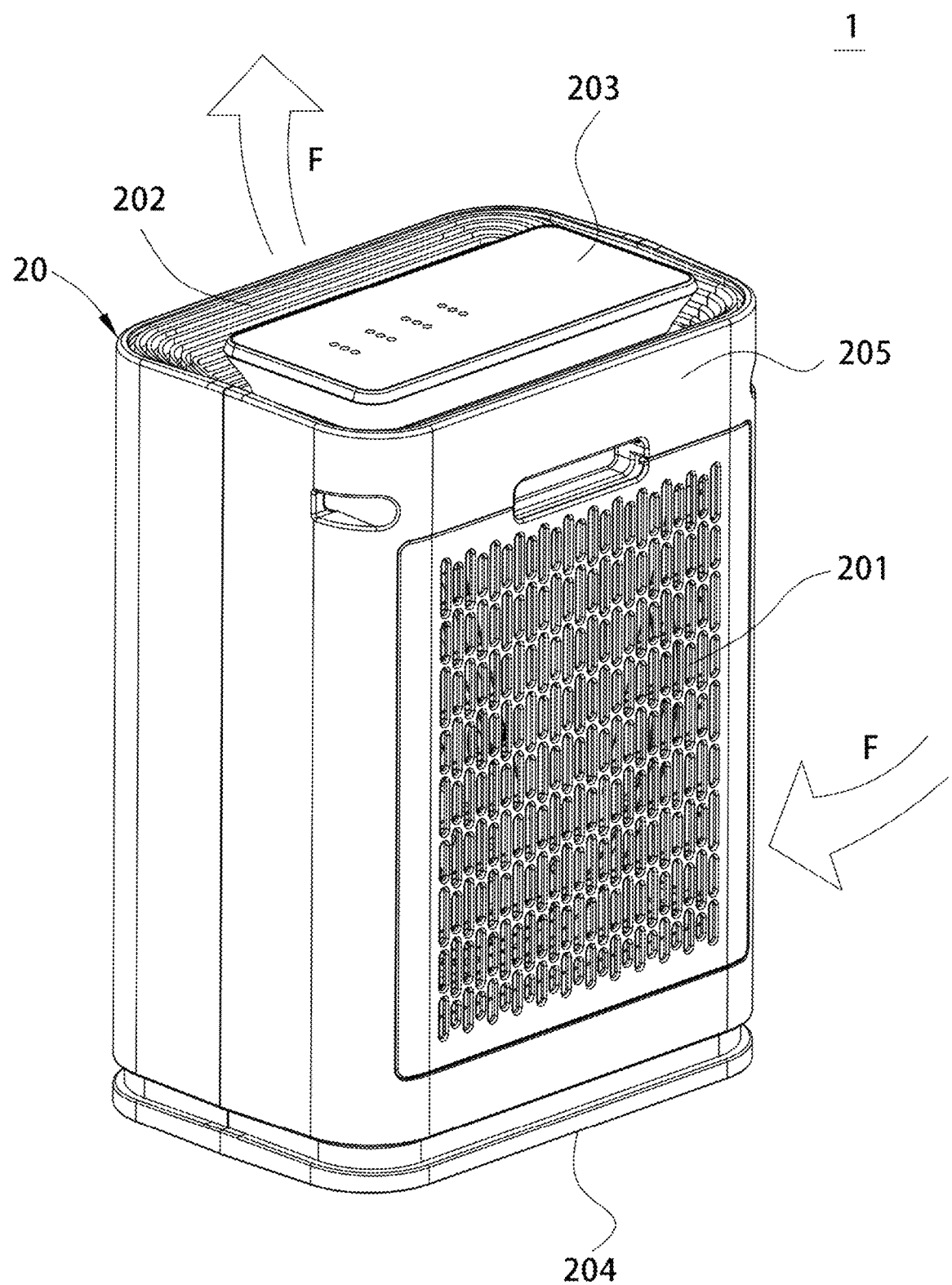
FIG. 1 is a perspective view of the appearance of the air sterilizing device according to one embodiment of the present disclosure.
Figure 2:
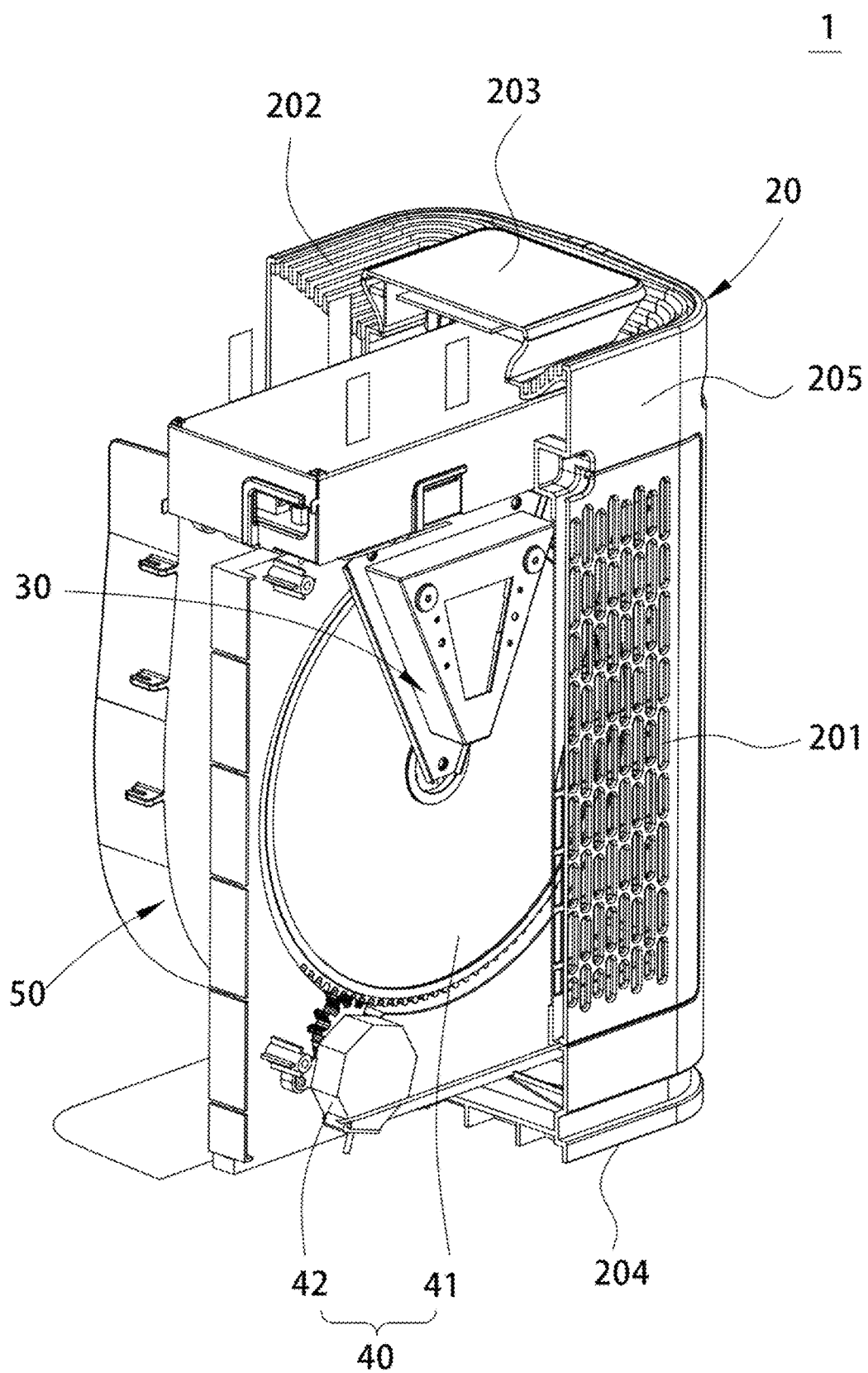
FIG. 2 is another perspective view of the air sterilizing device in FIG. 1 with a part of the casing removed.

In the following paragraphs and the accompanying drawings, the features and the implementations of several embodiments of the present disclosure are described in more detail along with the accompanying drawings. The features and the implementations described in the following paragraphs can be adopted solely or in combination with each other. In addition, the embodiments can be modified in various forms, as disclosed in the following paragraphs, and should not be limited to the embodiments described in the following paragraphs. Unless specified otherwise, the same reference characters refer to the same components.

The technical features provided in the present disclosure are not limited to the specific structures, uses, and applications described in the embodiments. The language used in the descriptions is illustrative and descriptive language which can be understood by the person of ordinary skill in the art. The terms regarding directions mentioned in the specification, including "front", "rear", "up", "down", "left", "right", "top", "bottom", "inside", and "outside", are illustrative and descriptive terms based on common usage scenarios, and manifests no intent to limit the scope of claims.

Furthermore, the definite and indefinite articles "a" and "the" and the numerical term "one" used in the specification referring to components of singular form do not exclude the concept of plural form. Equivalences known by one having ordinary skill in the art should be also included. All conjunctions used in similar situations should be interpreted in the broadest ways. The specific shapes, structural features, and technical terms described in the descriptions should also be interpreted to include equivalent structures and techniques which could achieve the same functionality.

In order to more clearly illustrate the present invention, the embodiments of the present disclosure will hereinafter be described in detail with reference to the accompanying drawings. Referring to FIGS. 1 to 4, they are three-dimensional and cross-sectional views of the air sterilizing device 1 according to one embodiment of the present disclosure. The air sterilizing device 1 comprises a casing 20, a sterilizing module 30, a wheel disc set 40 and a blower 50.

The casing 20 in this embodiment comprises an upper casing 203, a lower casing 204, and a side casing 205 arranged around and between the upper casing 203 and the lower casing 204. In this embodiment, an air inlet 201 is arranged on the side casing 205, and an air outlet 202 is arranged on the upper casing 203. In other embodiments, the air inlet 201 and the air outlet 202 may be arranged at other appropriate positions of the casing 20 to meet different design needs. e.g., the air inlet 201 and the air outlet 202 may be arranged on different sides of the side casing 205.

The sterilizing module 30, the wheel disc set 40 and the blower 50 are arranged in the casing 20. In this embodiment, the wheel disc set 40 is arranged between the blower 50 and the air inlet 201, and the sterilizing module 30 is arranged between the air inlet 201 and the wheel disc set 40. The blower 50 comprises an air suction inlet 51, an air exhaust outlet 52, and a blade 53. The location of the air suction inlet 51 of the blower 50 corresponds to the location of the wheel disc set 40, and the location of the air exhaust outlet 52 of the blower 50 corresponds to the location of the air outlet 202 of the casing 20. The outside air is sucked into the casing 20 through the air inlet 201, sterilized by the sterilizing module 30 and the wheel disc set 40, then the purified air is discharged through the air outlet 202 of the casing 20 to the outside of the air sterilizing device 1 by the blower 50. The mechanism configuration and operating principle of the blower 50 are known in the art, e.g., an axial flow fan can also be used. In other embodiments, the blower 50 may also be arranged between the air inlet 201 and the wheel disc set 40. In order to simplify the drawings and facilitate the description, other elements of the blower 50 are not shown in the drawings.

Figure 3:
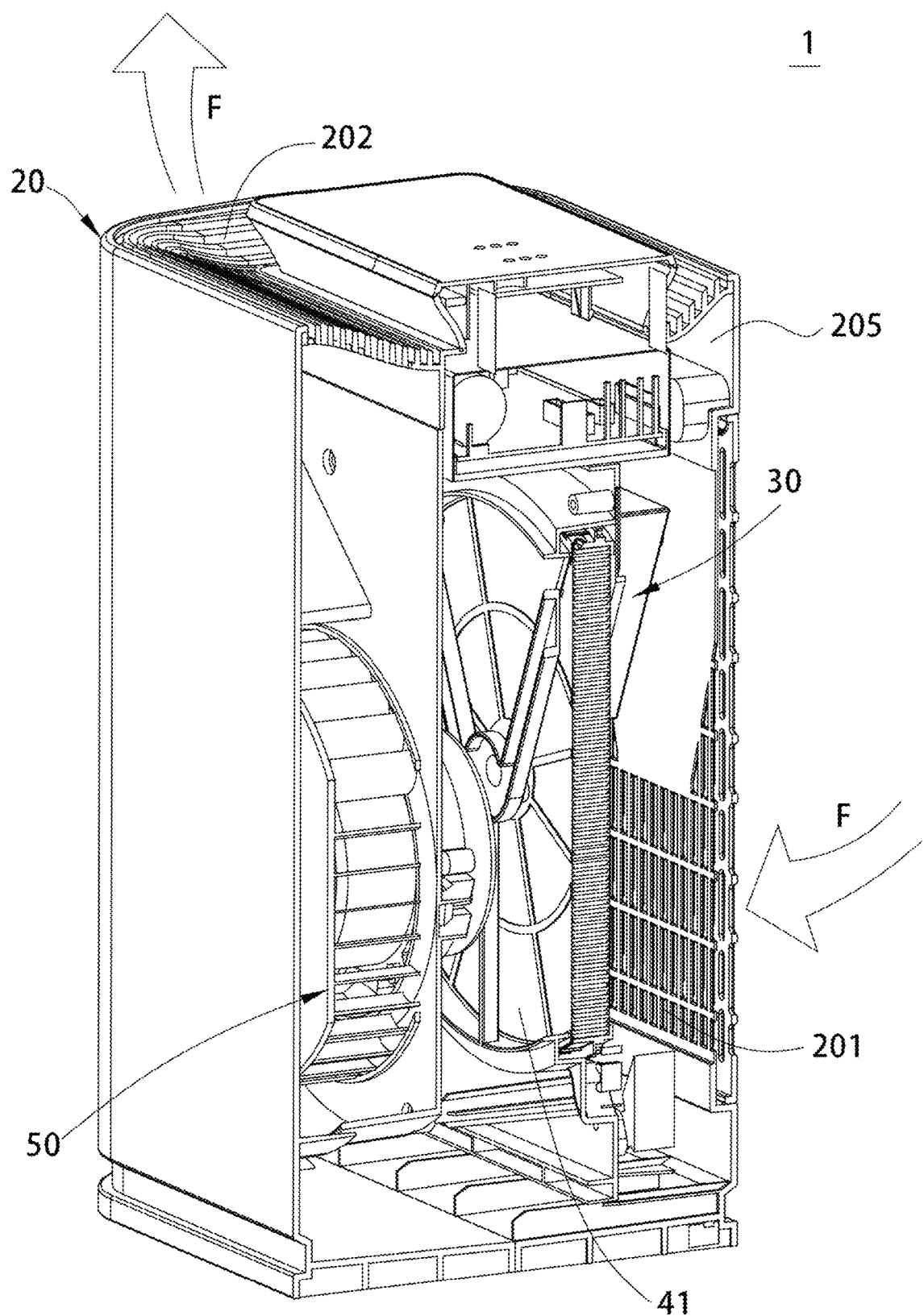
FIG. 3 is a cross-sectional view of the air sterilizing device in FIG. 1 from another perspective.
Figure 4:
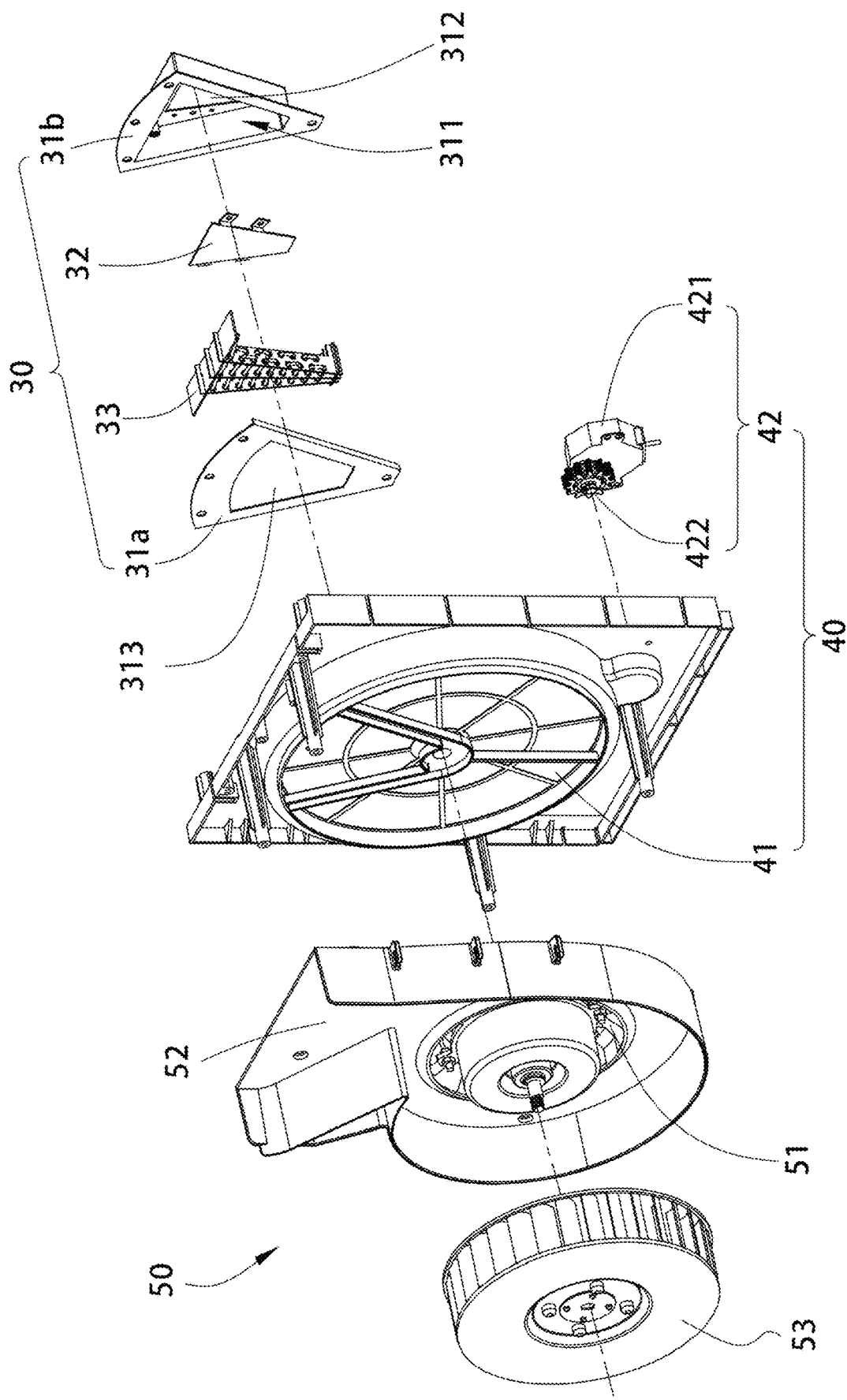
FIG. 4 is an exploded view of some parts of the air sterilizing device of the present disclosure.
Figure 5:
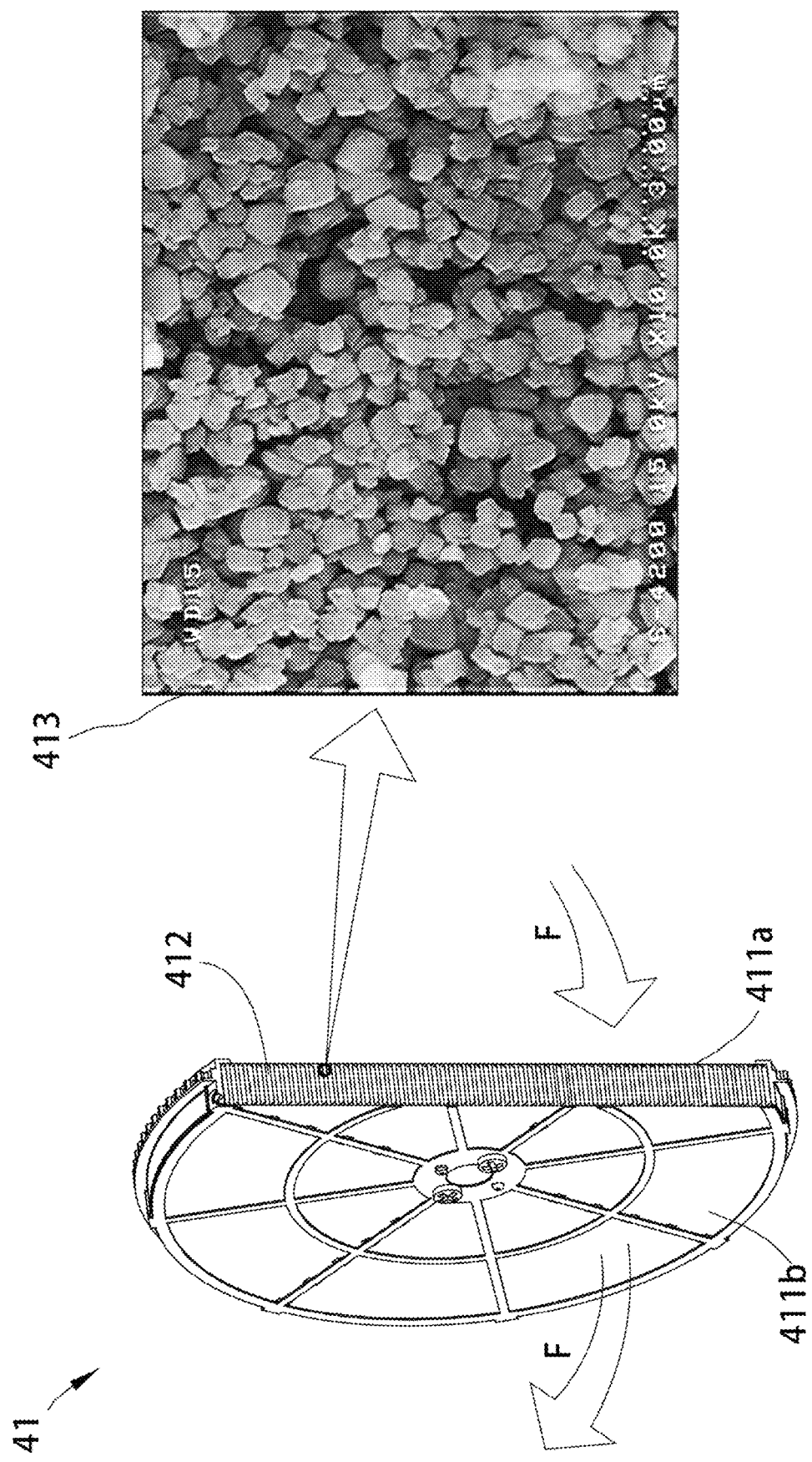
FIG. 5 is a cross-sectional and partial enlarged view of the wheel disc of the air sterilizing device.
Figure 6:
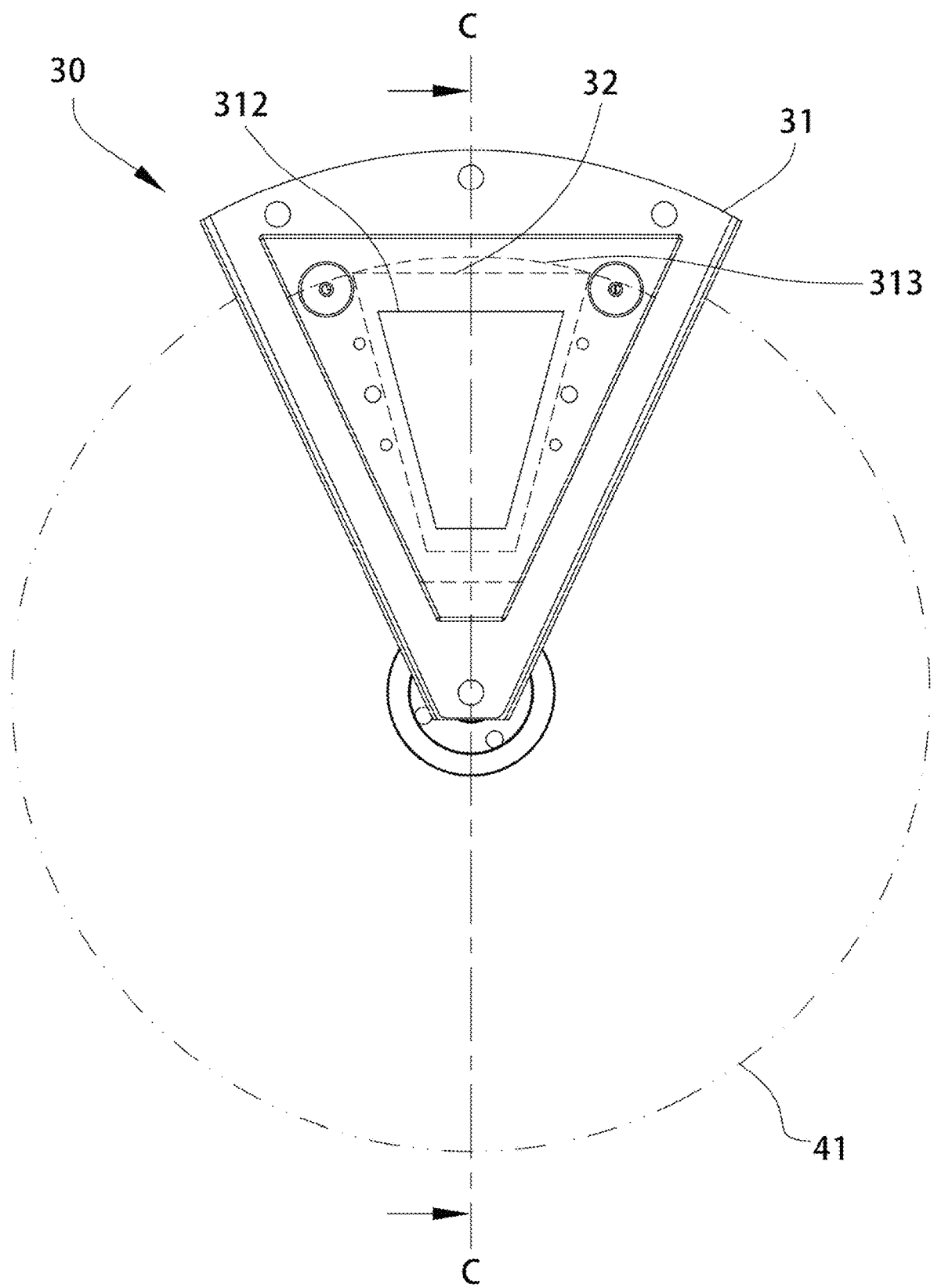
FIG. 6 is a front view of the sterilizing module according to one embodiment of the present disclosure.
Figure 7:
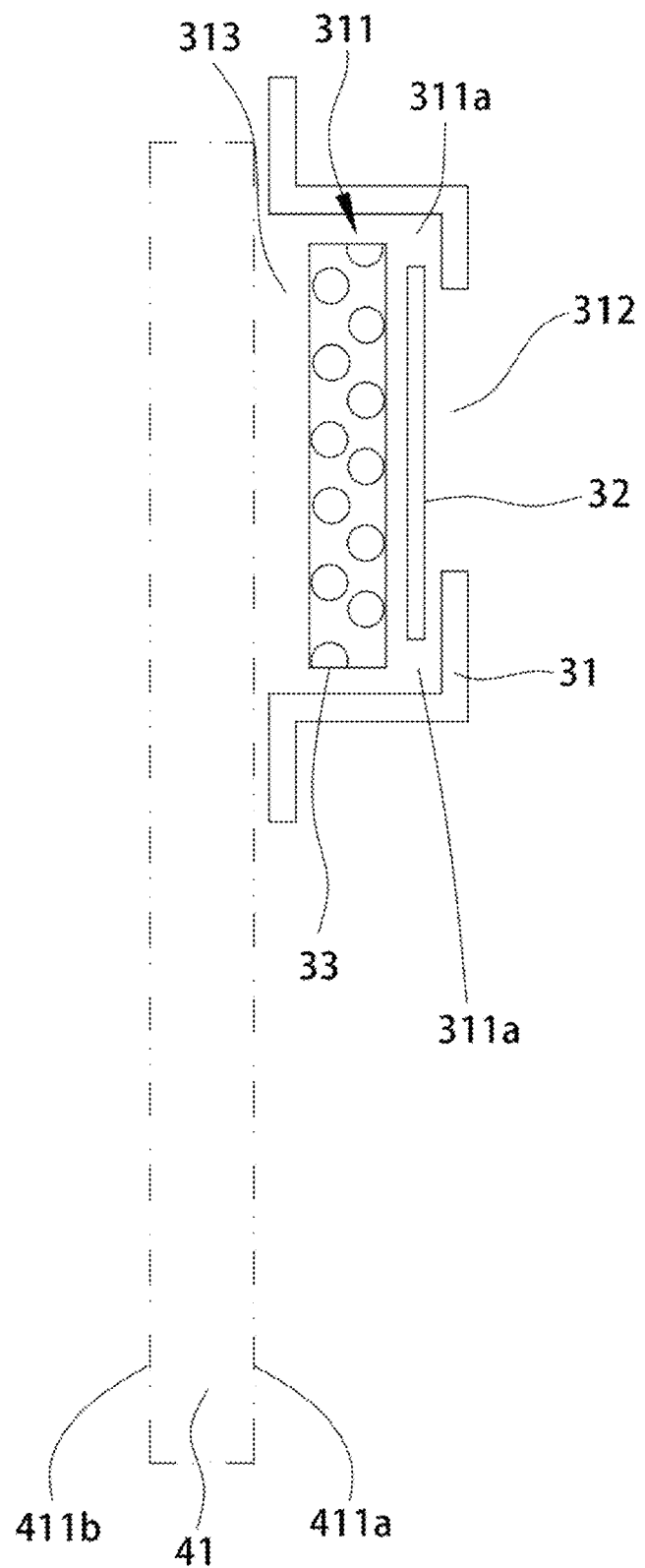
FIG. 7 is a cross-sectional view of the sterilizing module in FIG. 6 along the line C-C.

Referring to FIGS. 3 to 5, the wheel disc set 40 comprises a wheel disc 41 and a wheel disc driving mechanism 42. In this embodiment, the wheel disc 41 has a wheel-shaped body with uniform thickness, which has a first wheel surface and a second wheel surface opposing to the first wheel surface (referred to as the air inlet side 411a and the air outlet side 411b respectively). There are a plurality of holes 412 formed between the first wheel surface and the second wheel surface as well as penetrating the wheel-shaped body of the wheel disc 41. As a result, air can flow in the air inlet side 411a, through the holes 412, and then be discharged via the air outlet side 411b. On micro views, the outer surface of the wheel disc 41 is provided with microporous structures 413. The outer surface of the wheel disc 41 disclosed herein refers to the surface of the wheel disc 41 in contact with air. The outer surface may contain the inner wall surfaces of the holes 412 and at least one of the air inlet side 411a and the air outlet side 411b of the wheel disc 41, on which the microporous structures 413 are formed. When fine dust, bacteria or viruses contained in the air flow through the microporous structures 413, they are adsorbed onto the microporous structures 413 under the action of van der Waals force and electrostatic force, so the harmful suspended pollutants are captured. In this embodiment, the wheel disc 41 adopts a heat-resistant fiber skeleton for forming the holes 412. Zeolite, molecular sieve, etc. are applied to the heat-resistant fiber skeleton to form the microporous structures 413 on the outer surface. Moreover, the size and the structure type of the microporous structures 413 can be varied considering different design factors. E.g., microporous structures with a suitable pore size of less than 2 nanometers or less than 50 nanometers may be used. The microporous structures 413 also may have a suitable pore size of less than 20 nanometers. FIG. 5 shows a partial enlarged view of the microporous structure 413 on the inner wall of the hole 412 according to one embodiment of the present disclosure. When the blower 50 sucks air, the airflow F flows in the air inlet side 411a of the wheel disc 41, passing through the holes 412, and then flows out via the air outlet side 411b of the wheel disc 41. In this embodiment, the wheel disc driving mechanism 42 is provided with a power unit 421 and an output shaft 422. The output shaft 422 is provided with a gear engaged with the toothed rim of the wheel disc 41. When the power unit 421 drives the gear of the output shaft 422 to rotate, the wheel disc 41 is driven to rotate correspondingly. The rotation speed of the wheel disc 41 depends on the rotation speed of the gear of the output shaft 422 driven by the power unit 421.

The wheel disc 41 provided with the holes 412 and the microporous structures 413 adsorbs, retains and captures airborne bacteria and viruses flowing through the wheel disc 41. The wheel disc driving mechanism 42 drives the wheel disc 41 to rotate so that all parts of the wheel disc 41 can pass through the sterilizing module 30 which eliminates the bacteria and viruses adsorbed on the wheel disc 41. FIG. 5 shows the flowing direction of the airflow F at the air inlet side 411a and the air outlet side 411b of the wheel disc 41. Usually, more bacteria and viruses are collected on the air inlet side 411a, so the sterilizing module 30 is preferably arranged adjacent to the air inlet side 411a of the wheel disc 41.

Referring to FIGS. 3 to 7, the sterilizing module 30 is arranged on one side of the wheel disc 41. In this embodiment, the sterilizing module 30 is arranged adjacent to the air inlet side 411a. The sterilizing module 30 comprises a cover 31, a reflector 32 and a sterilizing element 33. In this embodiment, the cover 31 comprises a first cover 31a and a second cover 31b. In other embodiments, the cover 31 can be integrally formed or assembled by multiple components. In this embodiment, the cover 31 is arranged adjacent to but not in contact with the surface of the wheel disc 41 to ensure the smooth rotation of the wheel disc 41, and to prevent air from escaping via the gap between the cover 31 and the wheel disc 41 without passing through the wheel disc 41. An opening 313 is arranged at a first side of the cover 31 which is adjacent to the wheel disc 41 (on the first cover 31a), and a vent 312 is arranged at a second side of the cover 31 which is away from the wheel disc 41 (on the second cover 31b). A first space 311 is formed between the opening 313 and the vent 312 of the cover 31. The reflector 32 and the sterilizing element 33 are arranged within the first space 311, and the sterilizing element 33 is arranged between the reflector 32 and the wheel disc 41. The reflector 32 is arranged to cover the vent 312 but is not completely attached to the cover 31, so that a non-linear channel 311a is formed which allows the air to flow along a path from the vent 312, through the inner peripheral wall of the cover 31 and the first reflector 32, to the first space 311. When the blower 50 sucks air, part of the sucked air flows through the non-linear channel 311a and sterilized by the sterilizing element 33, after which it flows through the wheel disc 41 into the blower 50, then being discharged via the air outlet 202 to the outside of the air sterilizing device 1.

The efficacy factors in killing bacteria or viruses by heating or UV irradiation mainly include intensity (temperature or light intensity) and sterilization (heating, irradiation) time. e.g., the novel coronavirus (COVID-19) is inactivated and loses its infectivity by exposure to 56° C. for 30 minutes; but if a filter heated to 200° C. is used for purification, it can eliminate 99.8% of the COVID-19 viruses in the airflow within about 0.01 seconds. In addition, the time required for sterilization can be shortened by about 10 times every time the temperature is increased by 10° C. Generally, the blowers of household air conditioners drive air to flow at a rate of about 1.5-6 m/s, so the air directly flowing through the sterilizing element is sterilized in a quite short time. e.g., when the air flows at 2 m/s and the sterilization path is 0.02 m, it will flow through the sterilization path within 0.01 seconds, indicating that a temperature of higher than 200° C. is required for effective heat sterilization in this short time.

The shape of the sterilizing module 30 and the rotation speed of the wheel disc set 40 according to the present disclosure can be adjusted according to the energy and time required for sterilization. For instance, the sterilizing element 33 of the sterilizing module 30 may provide a sterilization-acting range as a fan-shaped area with a central angle of 30° on the wheel disc 41 while the wheel disc 41 takes 120 seconds to turn a circle. As a result, a certain area on the wheel disc 41 corresponding to the sterilization-acting range would be sterilized by the sterilizing module 30 over a 10-second period, which is 1/12 of the rotation period of the wheel disc 41 (with a rotation angle of 360°). The sterilization time may be extended as required, so that the energy consumption of the sterilizing element 33 (e.g., by heat or light sterilizing means) can be reduced to save power.

Figure 8:
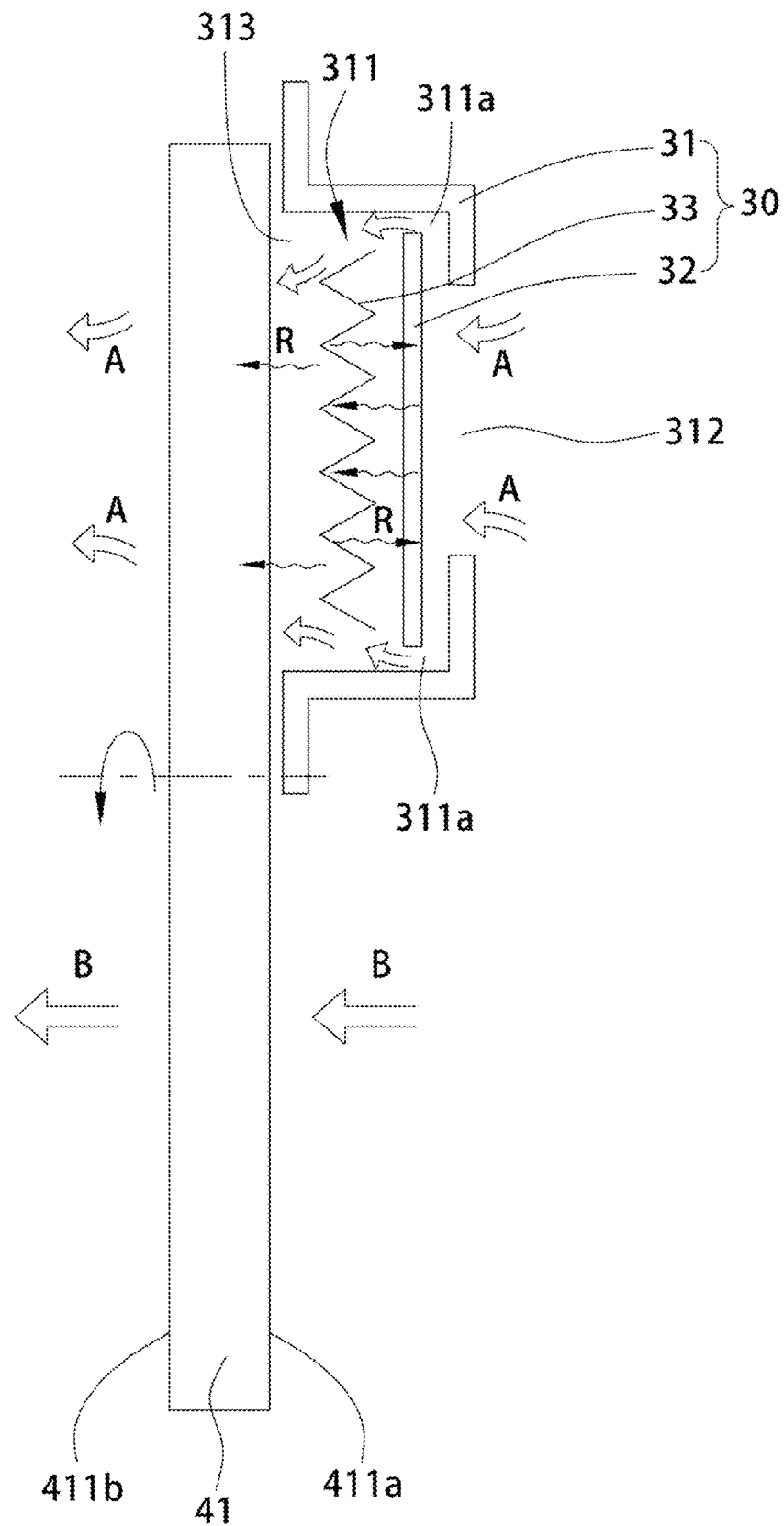
FIG. 8 is a schematic diagram illustrating the air flows in the air sterilizing device in FIG. 1.

In the embodiment of FIG. 8, the sterilizing element 33 is exemplified by an electrical heating element and represented by a zigzag symbol. The heat radiation generated by the sterilizing element 33 is represented by arrows and R, and an appropriate heating power or temperature can be set depending on, for example, the types of viruses or bacteria to be eliminated. The reflector 32 is arranged between the vent 312 and the sterilizing element 33, and can reflect the heat radiation R generated by the sterilizing element 33, so that the heat radiation R can be concentrated in the opening 313 for sterilizing the wheel disc 41 rather than directly dissipate through the vent 312. In other words, the reflector 32 can effectively prevent the sterilizing element 33 from dissipating heat to the outside. In addition, the non-linear channel 311a formed by the reflector 32 and the cover 31 is in a bent shape, which blocks the air in the first space 311 from flowing back, and reduces the heat energy dissipation. Thus, the reflector 32 can work with the cover 31 to concentrate the heat radiation R, maintain the sterilizing temperature on the wheel disc 41 and reduce the heat energy dissipation to effectively save energy and improve the sterilizing effect.

The operations of the air sterilizing device 1 are described below along with in FIGS. 3 to 8. When the air sterilizing device 1 works, the blower 50 operates to introduce outside air into the casing 20 through the air inlet 201, and the wheel disc 41 is driven by the wheel disc driving mechanism 42 to rotate at a proper speed. For the convenience of description, the introduced outside air is divided into a first portion of air A and a second portion of air B. The first portion of air A flows through the sterilizing module 30 before flowing through the wheel disc 41, and the second portion of air B flows through the wheel disc 41 rather than the sterilizing module 30. The first portion of air A flows into the first space 311 from the vent 312 of the cover 31 through the non-linear channel 311a, being heated and sterilized by collaboration of the sterilizing element 33 and the reflector 32, which indicates the first sterilization process. Then the first portion of air A after being heated and sterilized flows through the holes 412 of the wheel disc 41 and over the microporous structures 413 on the holes 412, where bacteria and viruses are captured. Afterwards, such bacteria and viruses captured by the microporous structures 413 are inactivated as the sterilizing element 33 also sterilizes the wheel disc 41, which indicates the second sterilization process. After being sterilized by the first and the second sterilization processes, the first portion of air A has been sterilized and is clean, then being discharged via the air outlet 202 to the outside of the air sterilizing device 1 by the blower 50. On the other hand, after the second portion of air B flows into the casing 20, it directly passes through the holes 412 of the wheel disc 41, where the bacteria and viruses in the second portion of air B are adsorbed, captured and filtered by the microporous structures 413. After flowing out from the wheel disc 41, the second portion of air B has been sterilized and is clean, then being discharged via the air outlet 202 to the outside of the air sterilizing device 1 by the blower 50. In addition, despite the part of the wheel disc 41 through which the second portion of air B flows is not covered and sterilized by the sterilizing element 33 then, it would be sterilized since all parts of the wheel disc 41 will pass through and sterilized by the sterilizing element 33 in sequence with the rotation of the wheel disc 41.

In the above embodiment, the wheel disc 41 is circular, and the range covered by the cover 31 of the sterilizing module 30 is roughly fan-shaped. More specifically, the cover 31 of the sterilizing module 30 covers a fan-shaped area (or a fan-like area) on the wheel disc 41, which is from the vicinity of the circle center to the circumference of the wheel disc 41. The central angle of the cover 31 can be set between 20° and 110°, and the area of the air inlet side 411a of the wheel disc 41 covered by the cover 31 can be set to 5-30% of the whole area of the air inlet side 411a of the wheel disc 41. When the wheel disc 41 is driven by the wheel disc driving mechanism 42 to rotate at a proper speed, different parts of the wheel disc 41 pass through the sterilizing module 30 in sequence and the bacteria and viruses adsorbed by the microporous structures 413 of the wheel disc 41 are sterilized and eliminated due to undergoing sufficient sterilization time.

The energy or power consumed by the sterilizing element 33 can be greatly reduced with a significant increase in the sterilization efficiency by using the non-linear channel 311a formed by the reflector 32 of the sterilizing module 30 and the reflection effect as the heating sterilization is processed in the sterilizing module 30 and by rotating the wheel disc 41 at a proper speed such that an appropriate sterilization time is set. In addition, the area of the air inlet side 411a of the wheel disc 41 covered by the sterilizing module 30 is much smaller than the uncovered area of the air inlet side 411a of the wheel disc 41. Therefore, the first portion of air A that flows through the sterilizing module 30 is less than the second portion of air B that does not flow through the sterilizing module 30. In other words, the first portion of air A heated by the sterilizing module 30 accounts for a smaller proportion of the air discharged out of the casing 20. Therefore, according to the parameters such as the suction and exhaust airflow rate of the blower 50, the rotation speed of the wheel disc 41, and/or the power, area and airflow rate of the sterilizing module 30, the temperature difference between the air sucked in the air inlet 201 and that discharged from the air outlet 202 of the air sterilizing device 1 can be set to 10° C. or less. The temperature and humidity of the air discharged from the air outlet 202 is not much different from that of the environment, and will not cause discomfort to the user.

Figure 9:
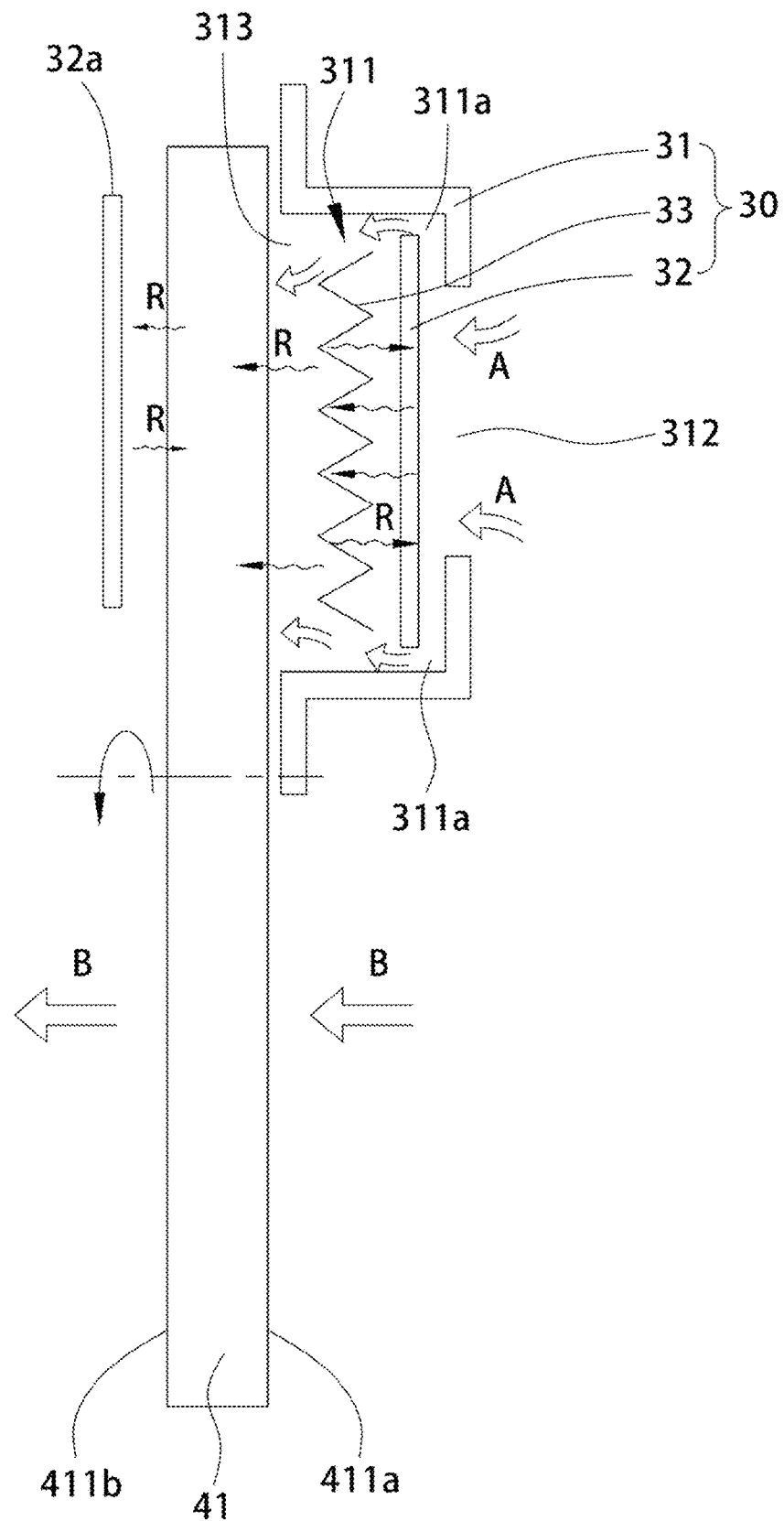
FIG. 9 is a schematic diagram illustrating the air flows in the air sterilizing device according to another embodiment of the present disclosure.

In the above embodiment, the sterilizing module 30 comprises a cover 31, a reflector 32 and a sterilizing element 33 that are covered by the cover 31, and is arranged at the air inlet side 411a of the wheel disc 41, which is not limited thereto. FIG. 9 discloses another embodiment of the air sterilizing device 1 of the present disclosure. In this embodiment, in addition to the aforementioned first sterilizing module 30, the air sterilizing device 1 further comprises a second reflector 32a which is arranged at the air outlet side 411b of the wheel disc 41. When the outside air flows into the air sterilizing device 1, the first portion of air A flows through the sterilizing module 30, the wheel disc 41, and then encounters the reflector 32a arranged at the air outlet side 411b of the wheel disc 41, so that part of heat radiation can be reflected back to the wheel disc 41 as the wheel disc 41 is adjacent to it. Such arrangement enables the heat radiation emitted by the sterilizing element 33 to be reflected back to the wheel disc 41 by the reflector 32a after it passes through the wheel disc 41, which further reduces energy consumption, improves energy efficiency, and more effectively eliminates bacteria and viruses on the wheel disc 41.

Figure 10:
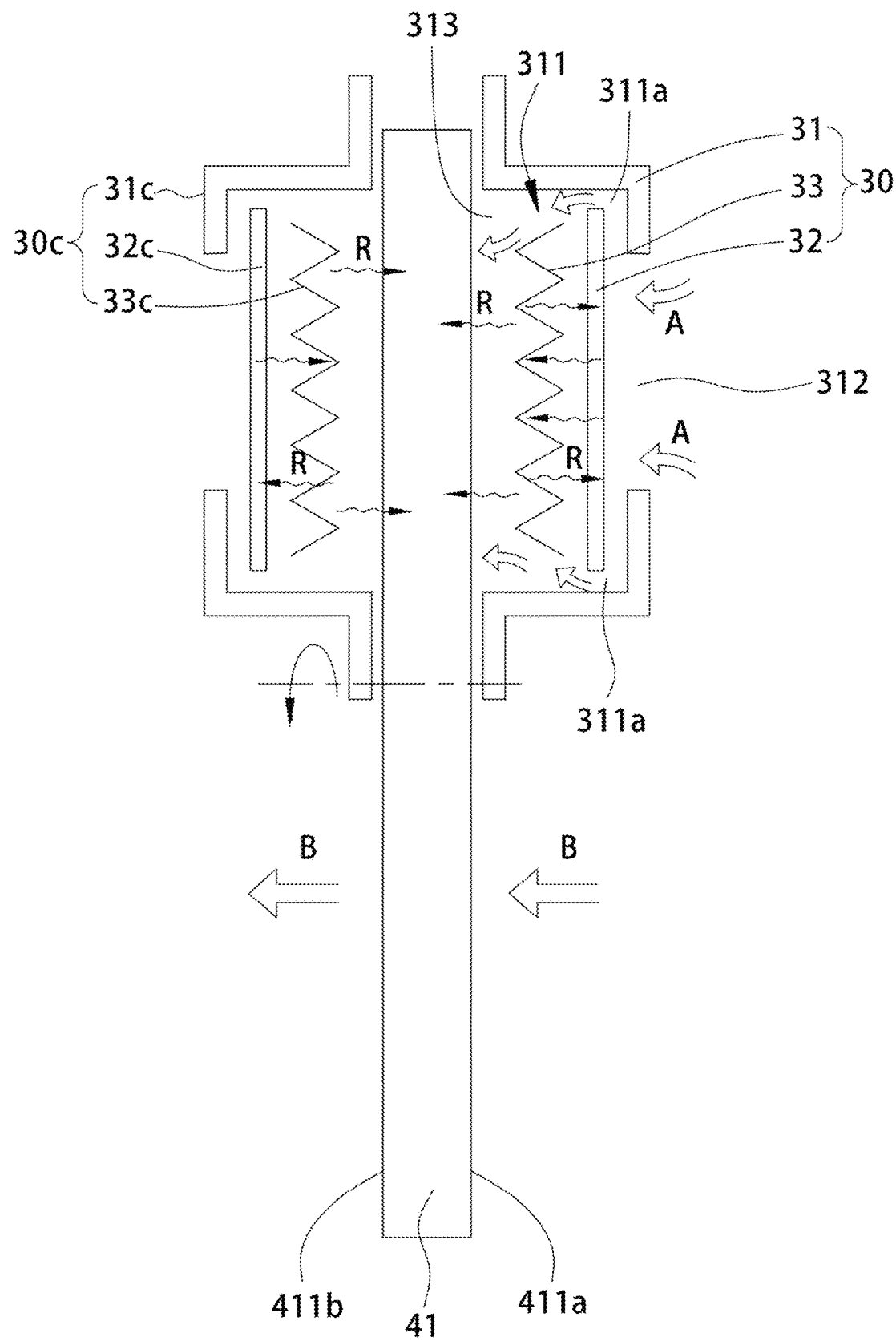
FIG. 10 is a schematic diagram illustrating the air flows in the air sterilizing device according to another embodiment of the present disclosure.

FIG. 10 discloses another embodiment of the air sterilizing device 1 of the present disclosure. In this embodiment, in addition to the aforementioned first sterilizing module 30, the air sterilizing device 1 is provided with a second sterilizing module 30c close to the air outlet side 411b of the wheel disc 41. The sterilizing module 30c comprises a cover 31c, a reflector 32c and a sterilizing element 33c. In this embodiment, when the air sterilizing device 1 works, the outside air enters the device 1, and the first portion of air A flows into the first sterilizing module 30 at the air inlet side 411a of the wheel disc 41. After passing through the wheel disc 41, the first portion of air A is re-sterilized via heat or light radiation emitted by the second sterilizing module 30c. Since there are two sterilizing modules 30 and 30c respectively sterilize both sides of the wheel disc 41, the sterilization efficiency is improved and thorough sterilization of the wheel disc 41 is ensured.

The above-mentioned sterilizing elements are not limited to electrical heating elements. In addition to heat radiation elements, heating element, UV element, IR element, etc. or their combination can be used for sterilization. In addition, the casing in different shapes can be used as needed, which is not limited to square column. The amount of the air inlets and outlets are not limited to one set, and can be arranged at different positions of the casing to allow the air to flow smoothly and to go through the wheel disc where it is filtered and sterilized.

The present disclosure may also provide other embodiments. Without departing from the spirit and essence of the present disclosure, those skilled in the art can make a variety of changes and deformations thereto, but such changes and deformations should fall within the protection scope of the claims of the present disclosure.

The embodiments described above are only some exemplary embodiments of the present disclosure. All equivalent structures which employ the concepts disclosed in this specification and the appended claims should fall within the scope of the present disclosure.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An air sterilizing device, comprising:
   a casing on which an air inlet and an air outlet are arranged;
   a blower, arranged in the casing and driving an airflow to flow from the air inlet to the air outlet;
   a wheel disc, arranged in a path of the airflow and comprising a wheel-shaped body with uniform thickness, wherein the wheel-shaped body comprises a plurality of holes allowing the airflow to pass through the wheel-shaped body and comprises a plurality of microporous structures on an outer surface of the wheel-shaped body; and a first sterilizing module, arranged between the air inlet and the wheel disc and arranged adjacent to an air inlet side of the wheel disc, wherein the first sterilizing module comprises:
- a cover, comprising an opening arranged on a first side of the cover adjacent to the wheel disc, a vent arranged on a second side of the cover away from the wheel disc, and a first space formed between the opening and the vent;
- a first reflector, arranged within the first space and spaced from the vent for forming a non-linear channel from the vent to the first space, bypassing the first reflector;
- a sterilizing element, arranged within the first space and located between the opening and the first reflector; and
- a driving mechanism, driving the wheel disc to rotate with respect to the first sterilizing module;

wherein after the blower introduces outside air into the casing through the air inlet, a first portion of the outside air flows into the first space through the non-linear channel of the first sterilizing module;

wherein the first portion of the air flows through the sterilizing element, through the holes of the wheel disc and over the microporous structures, and is discharged from the air outlet of the casing;

wherein a second portion of the outside air flows through the holes of the wheel disc not covered by the first sterilizing module and over the microporous structures, and is discharged from the air outlet of the casing.

2. The air sterilizing device of claim 1, wherein the cover is substantially fan-shaped, the wheel disc is substantially circular, and the cover covers at least an area between the center and partial circumference of the wheel disc.

3. The air sterilizing device of claim 1, further comprising a second sterilizing module, arranged between the wheel disc and the air outlet, and located at an air outlet side of the wheel disc away from the air inlet.

4. The air sterilizing device of claim 1, further comprising a second reflector, arranged between the wheel disc and the air outlet, and located at an air outlet side of the wheel disc away from the air inlet.

5. The air sterilizing device of claim 1, wherein a temperature difference between air discharged from the air outlet and air sucked into the air inlet is less than or equal to 10° C.

6. The air sterilizing device of claim 1, wherein the cover covers 5% to 30% of the air inlet side of the wheel disc.

7. The air sterilizing device of claim 1, wherein the sterilizing element further comprises at least one of an electrical heating component, an infrared generator, and an ultraviolet generator.

8. The air sterilizing device of claim 1, wherein the blower is arranged between the air inlet and the wheel disc.

9. The air sterilizing device of claim 1, wherein the blower is arranged between the wheel disc and the air outlet.

* * * * *